United States Patent
Lee et al.

(10) Patent No.: US 9,471,161 B2
(45) Date of Patent: Oct. 18, 2016

(54) TOUCH SCREEN PANEL

(75) Inventors: Choon-Hyop Lee, Yongin (KR);
Mikiya Itakura, Yongin (KR);
Sung-Ku Kang, Yongin (KR);
Jung-Mok Park, Yongin (KR)

(73) Assignee: SAMSUNG DISPLAY CO., LTD., Yongin, Gyeonggi-do (KR)

(*) Notice: Subject to any disclaimer, the term of this patent is extended or adjusted under 35 U.S.C. 154(b) by 347 days.

(21) Appl. No.: 12/926,791

(22) Filed: Dec. 9, 2010

(65) Prior Publication Data

US 2011/0242057 A1 Oct. 6, 2011

(30) Foreign Application Priority Data

Apr. 1, 2010 (KR) .................. 10-2010-0029950

(51) Int. Cl.
*G06F 3/042* (2006.01)
*G06F 3/041* (2006.01)

(52) U.S. Cl.
CPC ..... *G06F 3/041* (2013.01); *G06F 2203/04103* (2013.01)

(58) Field of Classification Search
CPC .............. G06F 2203/04103; G06F 3/041
USPC ................................. 345/171–176
See application file for complete search history.

(56) References Cited

U.S. PATENT DOCUMENTS

| | | | | |
|---|---|---|---|---|
| 8,013,955 B2* | 9/2011 | Katoh | .............. | G02F 1/13338 349/106 |
| 8,625,058 B2* | 1/2014 | Kozuma | .............. | G01J 1/02 257/294 |
| 8,773,622 B2* | 7/2014 | Kurokawa | ........ | G02F 1/133514 349/106 |
| 2004/0005739 A1* | 1/2004 | Furusawa | ......... | G02F 1/136209 438/149 |
| 2004/0169793 A1* | 9/2004 | Ino | .............. | G02F 1/133514 349/106 |
| 2006/0077510 A1* | 4/2006 | Chui et al. | ...................... | 359/260 |
| 2006/0221428 A1* | 10/2006 | Yamada | ...................... | 359/245 |
| 2007/0013819 A1* | 1/2007 | Pak et al. | ...................... | 349/12 |
| 2008/0084366 A1* | 4/2008 | Saito et al. | ...................... | 345/76 |
| 2008/0309633 A1* | 12/2008 | Hotelling et al. | ............ | 345/173 |
| 2009/0096767 A1* | 4/2009 | Liu | .............. | G06F 3/044 345/175 |
| 2009/0102814 A1* | 4/2009 | Lin et al. | ...................... | 345/174 |
| 2009/0146992 A1* | 6/2009 | Fukunaga | ............. | G02F 1/13338 345/214 |
| 2009/0147191 A1* | 6/2009 | Nakajima et al. | ............ | 349/116 |
| 2009/0161047 A1* | 6/2009 | Cho | .............. | G02F 1/133516 349/106 |
| 2009/0207473 A1* | 8/2009 | Bita et al. | ...................... | 359/290 |
| 2009/0213534 A1* | 8/2009 | Sakai | .............. | G02F 1/13452 361/679.21 |

(Continued)

FOREIGN PATENT DOCUMENTS

JP H10288707 A 10/1998
JP 2007-057762 A 3/2007

(Continued)

OTHER PUBLICATIONS

Taiwanese Office Action dated May 25, 2015.

(Continued)

*Primary Examiner* — Quan-Zhen Wang
*Assistant Examiner* — Tony Davis
(74) *Attorney, Agent, or Firm* — Lee & Morse, P.C.

(57) ABSTRACT

A touch screen panel including a transparent substrate; a background layer including a color printing layer along an edge of a surface of the transparent substrate; an overcoating layer on the surface of the transparent including the upper portion of the background layer; conductive sensing cells on the overcoating layer; and position detection lines.

19 Claims, 4 Drawing Sheets

(56) References Cited

U.S. PATENT DOCUMENTS

| | | | |
|---|---|---|---|
| 2010/0001973 A1* | 1/2010 | Hotelling et al. | 345/174 |
| 2010/0007632 A1* | 1/2010 | Yamazaki | H01L 27/3234 345/175 |
| 2010/0026661 A1* | 2/2010 | Teramoto | 345/174 |
| 2010/0066954 A1* | 3/2010 | Wang | G02F 1/133514 349/106 |
| 2010/0117991 A1* | 5/2010 | Koyama | G02F 1/13338 345/175 |
| 2010/0123681 A1* | 5/2010 | Wu et al. | 345/174 |
| 2010/0182274 A1* | 7/2010 | Kang et al. | 345/174 |
| 2010/0208179 A1* | 8/2010 | Chang et al. | 349/110 |
| 2010/0231554 A1* | 9/2010 | Anno | G06F 3/0416 345/174 |
| 2010/0245723 A1* | 9/2010 | Chen | C09K 19/586 349/88 |
| 2011/0043486 A1* | 2/2011 | Hagiwara | G06F 3/042 345/175 |

FOREIGN PATENT DOCUMENTS

| | | |
|---|---|---|
| JP | 2007-057762 A | 3/2007 |
| KR | 10-0445291 B1 | 8/2004 |
| KR | 10-0683157 B1 | 2/2007 |
| KR | 10 2008-0012594 A | 2/2008 |
| KR | 10-0893498 B1 | 4/2009 |
| KR | 10 2009-0064147 A | 6/2009 |
| KR | 10 2009-0089273 A | 8/2009 |
| KR | 10-0945381 B1 | 2/2010 |
| TW | M355426 U1 | 4/1998 |
| WO | WO 2005/059635 A1 | 6/2005 |

OTHER PUBLICATIONS

Korean Office Action in KR 10-2010-0029950, dated Dec. 23, 2011 (Lee, et al.).

Korean Office Action in KR 10-2010-0029950, dated Jun. 24, 2011 (Lee, et al.).

* cited by examiner

TOUCH SCREEN PANEL

BACKGROUND

1. Field

Embodiments relate to a touch screen panel.

2. Description of the Related Art

A touch screen panel is an input device that selects content displayed on a screen, e.g., an image display device, etc. using a person's hand or an object to input commands of a user.

To this end, the touch screen panel may be provided on a front face of the image display device and converts positions directly contacting a person's hand or an object into electrical signals. Accordingly, the instruction selected at the contact point is received as an input signal.

As the touch screen panel can replace a separate input device that is operated by being connected with the image display device, e.g., a keyboard and a mouse, the use field of the touch screen panel is being gradually expanded.

SUMMARY

Embodiments are directed to a touch screen panel, which represents advantages over the related art.

It is a feature of an embodiment to provide a touch screen panel that can implement various colors at an edge thereof.

At least one of the above and other features and advantages may be realized by providing a touch screen panel including a transparent substrate; a background layer including a color printing layer along an edge of a surface of the transparent substrate, the background layer including an upper portion; an overcoating layer on the surface of the transparent substrate including the upper portion of the background layer; conductive sensing cells on the overcoating layer; and position detection lines.

The background layer may further include a black printing layer on the color printing layer.

The background layer may further include a white printing layer between the color printing layer and the black printing layer.

The touch screen panel may further include a transparent planarizing layer on an inner side of the background layer, the transparent planarizing layer overlying the conductive sensing cells.

The background layer may further include a metal filler layer on the color printing layer.

The background layer may further include a white printing layer between the color printing layer and the metal filler layer.

The background layer may further include a black printing layer on the metal filler layer.

The metal filler layer may include a reflective paint.

The background layer may further include a white printing layer on the color printing layer; a metal filler layer on the white printing layer; and a black printing layer on the metal filler layer.

The transparent substrate may be a window substrate disposed at an uppermost portion of substrates included in a display device, and the background layer, the overcoating layer, the conductive sensing cells, and the position detection lines may be formed on a lower surface of the transparent substrate, the lower surface being opposite to the touch surface of the transparent substrate.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Figure 1:
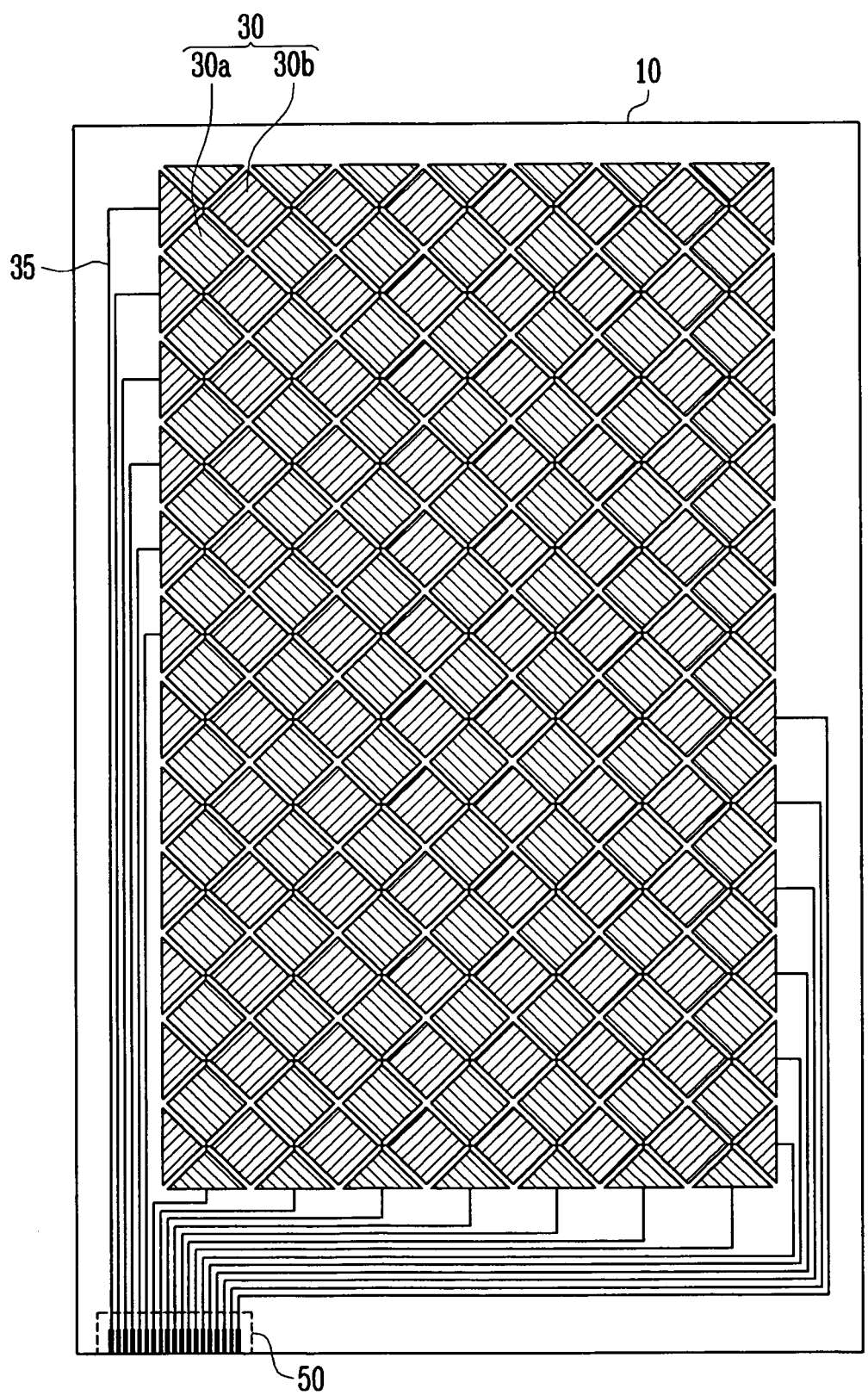
FIG. 1 illustrates a plan view schematically illustrating an example of a touch screen panel.

Korean Patent Application No. 10-2010-0029950, filed on Apr. 1, 2010, in the Korean Intellectual Property Office, and entitled: "Touch Screen Panel" is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

FIG. 1 illustrates a plan view of an example of a touch screen panel.

Referring to FIG. 1, a touch screen panel may include a transparent substrate 10, a plurality of conductive sensing cells 30 on the transparent substrate 10, and position detection lines 35 connecting the conductive sensing cells 30 with an external driving circuit through a pad unit 50.

The transparent substrate 10, i.e., a base member of the touch screen panel, may be formed of a transparent substrate material, e.g., PET (polyethylene terephthalate) or acryl. The transparency may inclusively imply, e.g., 100% transparency as well as transparency with high transmittance.

The sensing cells 30 may be made of a transparent electrode material, e.g., ITO, in a touch active region on one side of the transparent substrate 10. The sensing cells 30 may include first sensing cells 30a connected in a first direction and second sensing cells 30b connected in a second direction.

The first sensing cells 30a may be connected with each other in the first direction, e.g., in a column direction, and may connected with the position detection lines 35 in each column.

The second sensing cells 30b may be connected with each other in a second direction different from the first direction, e.g., a row direction, between and insulated from the first sensing cells 30a, and may be connected with the position detection lines 35 in each row.

The first sensing cells 30a and the second sensing cells 30b may be respectively connected by first connecting patterns and second connecting patterns (not illustrated), with insulating layers therebetween, on the same layer, or may be disposed on different layers, with insulating layers therebetween.

The position detection lines 35 may connect the sensing cells 30 with an external driving circuit (not illustrated), e.g., a position detection circuit, through the pad unit 50.

The position lines 35 may be disposed in a touch inactive region at edge portions of the touch screen panel, i.e., not a touch active region where an image is displayed, and may be formed of various suitable materials. In an implementation, the position lines 35 may be formed of a row-resistance material, e.g., Mo, Ag, Ti, Cu, Al, and/or Mo/Al/Mo, different from the transparent electrode material used for making the sensing cells 30.

The touch screen panel described above may be a capacitive type touch screen panel, in which, when a contact object, such as a user's hand or a stylus pen contacts the touch screen panel, a change of electrostatic capacitance corresponding to the contact position is transmitted to the driving circuit (not illustrated) from the sensing cells 30 through the position detection lines 35 and the pad unit 50.

Further, the change in electrostatic capacity may be converted into an electric signal by an X- and Y-input process circuit (not illustrated), such that the contact is located.

Figure 2:
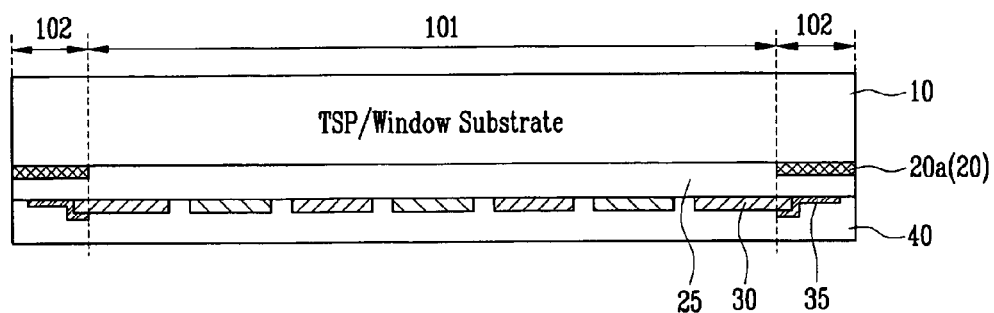
FIG. 2 illustrates a sectional view showing a touch screen panel according to an embodiment.

FIG. 2 illustrates a sectional view of a touch screen panel according to an embodiment.

Referring to FIG. 2, a touch screen panel according to the present embodiment may include a transparent substrate 10, a background layer 20 along an edge of one side, i.e., surface, of the transparent substrate 10, a overcoating layer 25 on the side of the transparent substrate 10 including the upper portion of the background layer 20 thereon, conductive sensing cells 30 and position detection lines 35 on the overcoating layer 25, and a protective layer 40 on the transparent substrate 10 including the upper portion of the position detection lines 35 and the conductive sensing cells 30 thereon.

The transparent substrate 10 may be a substrate that is the base member of the touch screen panel, but the embodiments are not limited thereto. In an implementation, the transparent substrate 10 may be a window substrate disposed at an uppermost portion of substrates included in a display device equipped with the touch screen panel.

That is, it is possible to implement a window-integral type touch screen panel having a window substrate integrally formed with, i.e., serving as, the transparent substrate 10 by forming the touch screen panel on the window substrate. In this configuration, it is possible to reduce a thickness of the display device equipped with the touch screen panel.

In the integral window type touch screen panel, as an example, the background layer 20, the overcoating layer 25, the conductive sensing patterns 30, and the position detection lines 35 may be formed on a lower surface of the transparent substrate 10 opposite to the touch surface (upper surface) thereof.

The background layer 20 may be formed along the edge of the side (i.e. the lower surface) of the transparent substrate 10 and may prevent the patterns, e.g., the position detection lines 35, from being seen by being formed in the touch inactive region 102 along an outer edge of the touch active region 101.

A color of the background layer 20 may depend on an edge color of the touch screen panel. In particular, the background layer 20 according to the present embodiment may be implemented in various ways by including at least a color printing layer 20a.

That is, the background layer 20 of the present embodiment may include the color printing layer 20a formed along the edge of the side of the transparent substrate 10.

The color printing layer 20a may be formed by, e.g., printing color ink onto the transparent substrate 10.

By forming the background layer 20 including the color printing layer 20a, it is possible to implement various colors for the background layer 20 and reduce the thickness thereof, with a relatively inexpensive and simple printing process.

The overcoating layer 25 may be made of a transparent insulating substrate and may be formed over an entire surface of the transparent substrate 10, including upper portions of the background layer 20.

The conductive sensing cells 30 may be formed in the touch active region 101 on the overcoating layer 25, may be formed of a transparent electrode material, and may be connected to the position detection lines 35 in each row or column. For the convenience of description, connecting patterns that connect the conductive sensing cells 30 in each row or column and insulating layers disposed between the connecting patterns are not illustrated in FIG. 2.

The position detection lines 35 may be formed in the touch inactive region 102 on the overcoating layer 25 and may be connected with the sensing cells 30 in each row or column.

The protective layer 40 may be made of a transparent insulating material and may be formed over an entire surface of the transparent substrate 10, including upper portions of the conductive sensing cells 30 and the position detection lines 35.

As described above, in the present embodiment, it is possible to implement various colors for the touch screen panel through a simple process, by forming the background layer 20 including at least the color printing layer 20a along the edge of the transparent substrate 10 that is the base member of the touch screen panel.

Further, when the window substrate is integrally formed with, i.e., serving as, the transparent substrate 10 of the touch screen panel, it is possible to reduce the thickness of the display device equipped with the touch screen panel, simplify the manufacturing process, and reduce the material cost, thereby improving manufacturing efficiency.

Figure 3:
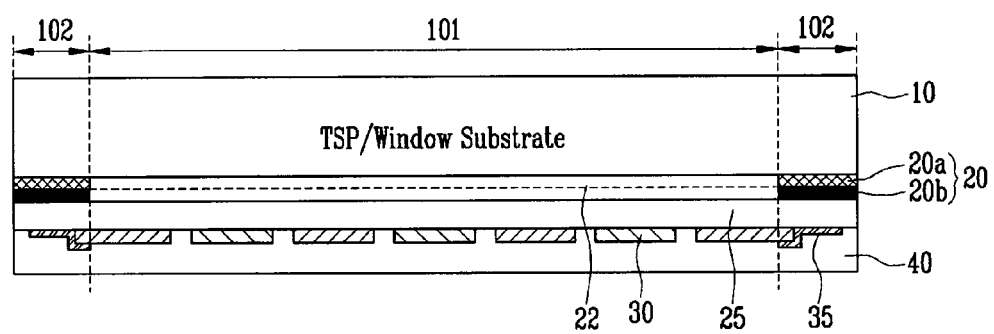
FIG. 3 illustrates a sectional view showing a touch screen panel according to another embodiment.

FIG. 3 illustrates a sectional view of a touch screen panel according to another embodiment. For the convenience of description, similar components to those of FIG. 2 are not repeatedly described in describing FIG. 3.

Referring to FIG. 3, in the touch screen panel according to the present embodiment, the background layer 20 may further include a black printing layer 20b on one side of the color printing layer 20a.

In this configuration, the black printing layer 20b may be formed on a surface facing the position detection lines 35 of the background layer 20. Thus, it is possible to more effectively prevent the patterns, e.g., the position detection lines 35, from being seen-through, by additionally forming the black printing layer 20b on the background layer 20a to implement a stacking layer with the color printing layer 20a.

That is, the black printing layer 20b may be positioned between the pattern of the touch screen panel, e.g., the position detection lines 35, and the color printing layer 20a.

As described above, in the present embodiment, by forming the background layer 20 by stacking the color printing layer 20a and the black printing layer 20b, it is possible to effectively prevent patterns at the lower portion from being seen through the color printing layer 20a having predetermined transmittance.

A transparent planarizing layer 22 formed of a transparent resin layer may be further formed on an inner side of the background layer 20 to overlie the conductive sensing cells 30.

By forming the transparent planarizing layer 22, the background layer 20 may include a stacking layer composed of at least two printing layers, e.g., the color printing layer 20a and the black printing layer 20b, such that it is possible to reduce a difference in height between the touch active region 101 and the touch inactive region 102.

In this configuration, a difference in height between the touch active region 101 and the touch inactive region 102 may be reduced by forming a transparent resin layer after the printing layer 20a and then forming the black printing layer 20b and a transparent resin layer again. Alternatively, it is possible to form the transparent planarizing layer 22 by forming the color printing layer 20a and the black printing layer 20b and then forming the transparent resin layer.

Figure 4:
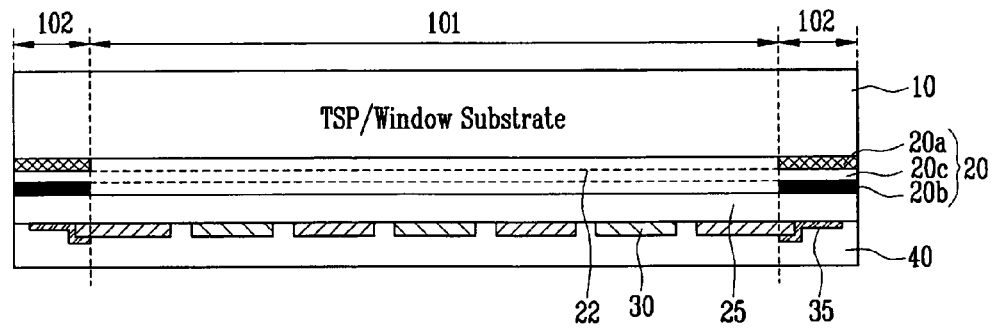
FIG. 4 illustrates a sectional view showing a touch screen panel according to yet another embodiment.

FIG. 4 illustrates a sectional view of a touch screen panel according to yet another embodiment.

Referring to FIG. 4, in the touch screen panel according to the present embodiment, the background layer 20 may further include a white printing layer 20c between the color printing layer 20a and the black printing layer 20b.

By forming the white printing layer 20c between the color printing layer 20a and the black printing layer 20b as described above, it is possible to implement the background layer 20 having a clean color, more effectively preventing the pattern from been seen-through.

FIGS. 5 to 8 illustrate sectional views of touch screen panels according to additional embodiments.

In particular, FIGS. 5 to 8 illustrate embodiments that implement the background layer 20, using the color printing layer 20a, the black printing layer 20b, and/or the white printing layer 20c, which are disclosed in the embodiment described above, and a metal filler layer 20d.

Figure 5:
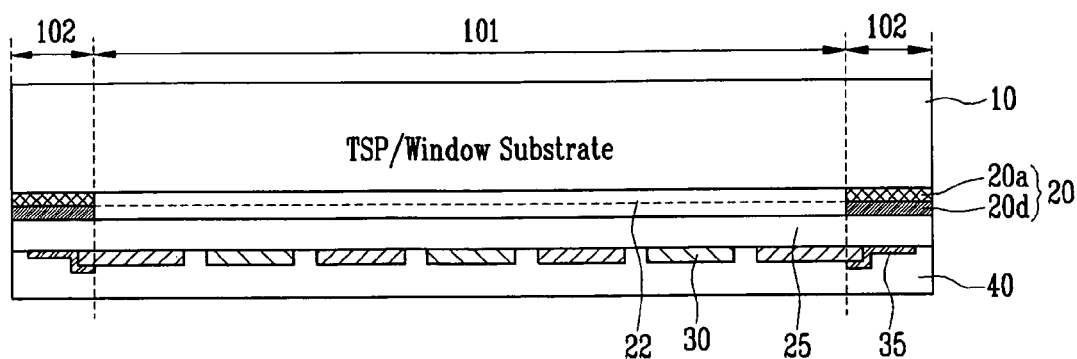
FIGS. 5 to 8 illustrate cross-sectional views showing touch screen panels according to more embodiments.

Referring to FIG. 5 first, the background layer 20 may include the color printing layer 20a and the metal filler layer 20d on one side thereof facing the position detection lines 35 of the color printing layer 20a.

The metal filer layer 20d may be formed by, e.g., gravure printing, using a reflective paint, particularly a paint containing reflective metal component.

It is possible to prevent the pattern, e.g., the position detection lines 35, at a lower portion of the device from being seen-through, by forming the metal filer layer 20d along with the color printing layer 20a.

Figure 6:
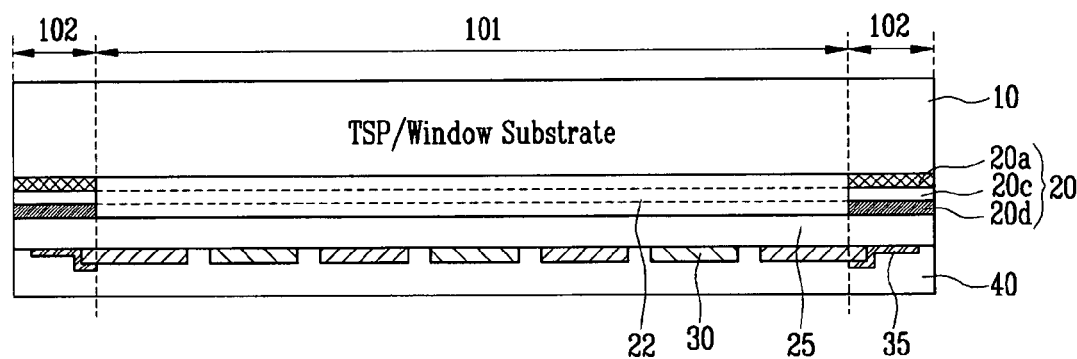
Figure 7:
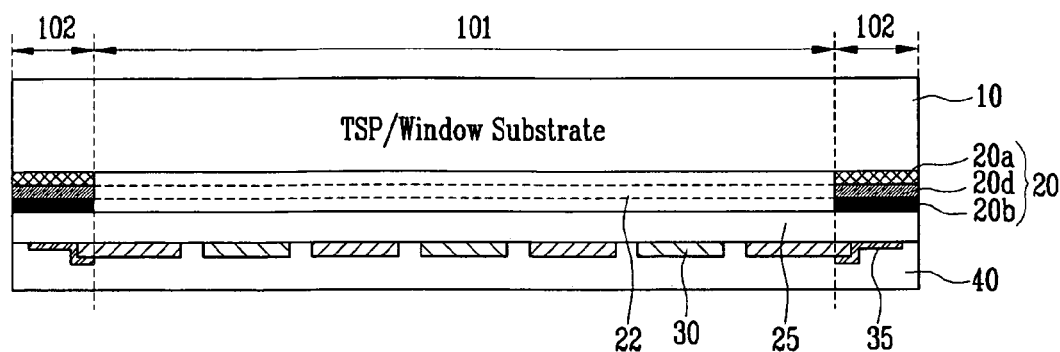

Referring to FIG. 6, by further forming the white printing layer 20c between the color printing layer 20a and the metal filler layer 20d, it is possible to more effectively prevent the patterns from being seen-through and to implement the background layer 20 having a clean color. Alternatively, as illustrated in FIG. 7, it is possible to more effectively prevent the patterns at the lower portion of the device from being seen-through by further forming the black printing layer 20b on the metal filer layer 20d.

Figure 8:
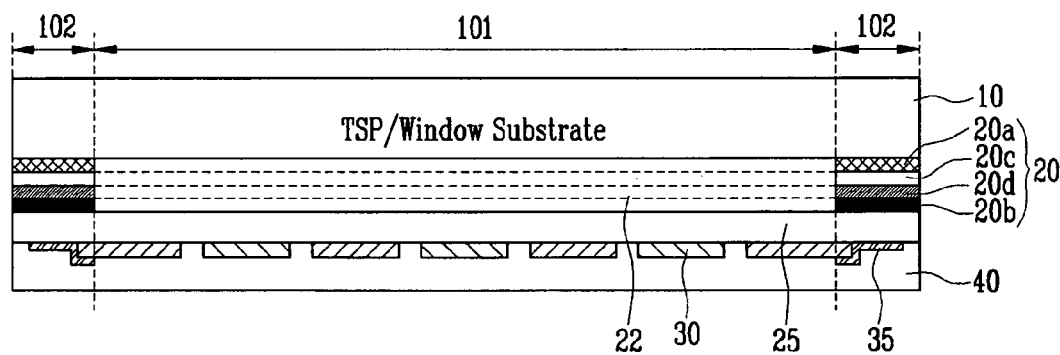

Alternatively, as illustrated in FIG. 8, it is possible to form the background layer 20 by sequentially forming the white printing layer 20c, the metal filler layer 20d, and the black printing layer 20b on the color printing layer 20a.

In this configuration, it is preferable that the white printing layer 20c is disposed on the color printing layer 20a and the black printing layer 20b is disposed toward the pattern at the lower portion of the device that is prevented from being visualized.

As described above, by stacking the white printing layer 20c, the metal filler layer 20d, and the black printing layer 20b on the color printing layer 20a, it is possible to implement the background layer 20 having a clean color, effectively preventing the patterns at the lower portion from being seen-through.

However, as the color of display devices equipped with a touch screen panel has recently been implemented in various ways, desirability of a method of implementing various colors at the edge of the touch screen panel has increased.

According to an embodiment having the above configuration, by forming the background layer including at least the color printing layer along the edge of the transparent substrate that is the base member of the touch screen panel, it is possible to implement various colors for the edge of the touch screen panel through a simple process. Hence, the embodiments described herein go beyond merely forming a black matrix in a touch inactive region around a touch active region to prevent position detection lines formed under the touch inactive region from being visualized and to form a black edge in the touch screen panel.

Further, by forming a stacking structure with the color printing layer by additionally forming one or more printing layers of the black printing layer, the white printing layer, and the metal filer layer on the background layer, it is possible to implement a clean color, effectively preventing the patterns under the background layer from being visualized.

Further, it is possible to reduce the thickness of a display device equipped with the touch screen panel, by integrally forming the window substrate with the transparent substrate of the touch screen panel.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A touch screen panel, comprising:
a transparent substrate;
a background layer including a color printing layer along an edge of a surface of the transparent substrate, the background layer including an upper portion;
an overcoating layer on the surface of the transparent substrate including the upper portion of the background layer; and
conductive sensing cells on the overcoating layer and in a display region for displaying an image, wherein:
the transparent substrate is a window substrate disposed at an uppermost portion of substrates included in a display device, and
the background layer, the overcoating layer, and the conductive sensing cells are formed on a lower surface of the transparent substrate; the lower surface being opposite to a touch surface of the transparent substrate, wherein the substrate includes a touch active region overlapping the display region and a touch inactive region overlapping the color printing layer and wherein:

the color printing layer includes a color material different from black printed on the touch inactive region of the transparent substrate, the color material to block transmission of light to prevent visibility of features under the color printing layer and to allow a predetermined color of the color material to be visible;

the color material overlaps the touch inactive region and does not overlap the touch active region, the color material overlaps one or more signal lines connected to one or more of the conductive sensing cells in the touch active region of the transparent substrate, and the background layer includes a metal filler layer on the color printing layer and a white printing layer between the color printing layer and the metal filler layer.

2. The touch screen panel as claimed in claim 1, wherein the background layer further includes a black printing layer on the color printing layer.

3. The touch screen panel as claimed in claim 2, wherein the white printing layer is between the color printing layer and the black printing layer.

4. The touch screen panel as claimed in claim 2, wherein the black printing layer is different from the color printing layer.

5. The touch screen panel as claimed in claim 2, wherein the color printing layer, the white printing layer, the metal filler layer, and the black printing layer are all different from one another.

6. The touch screen panel as claimed in claim 1, further comprising
a transparent planarizing layer on an inner side of the background layer, the transparent planarizing layer overlying the conductive sensing cells.

7. The touch screen panel as claimed in claim 1, wherein the background layer further includes a black printing layer on the metal filler layer.

8. The touch screen panel as claimed in claim 1, wherein the metal filler layer includes a reflective paint.

9. The touch screen panel as claimed in claim 1, wherein the background layer overlies the one or more signal lines to define a touch inactive region.

10. The touch screen panel as claimed in claim 1, wherein the metal filler layer is different from the color printing layer.

11. The touch screen panel as claimed in claim 1, wherein the color printing layer is between an outermost one of the conductive sensing cells and the edge of the surface of the transparent substrate.

12. The touch screen panel as claimed in claim 11, wherein the outermost one of the conductive sensing cells partially overlaps the color printing layer in the touch inactive region.

13. The touch screen panel as claimed in claim 11, wherein the touch inactive region is adjacent only one side of the touch active region.

14. The touch screen panel as claimed in claim 1, wherein the conductive sensing cells are coupled to the transparent substrate.

15. The touch screen panel as claimed in claim 1, wherein the color material of the color printing layer is different from white.

16. A touch screen panel, comprising:
a transparent substrate including a touch inactive region and a touch active region for displaying an image;
a color printing layer on the touch inactive region; and
a plurality of conductive sensing cells overlapping the touch active region, wherein the color printing layer is between an outermost one of the conductive sensing cells and an edge of the transparent substrate and wherein:

the color printing layer includes a color material different from black printed on the touch inactive region of the transparent substrate, the color material to block transmission of light to prevent visibility of features under the color printing layer and to allow a predetermined color of the color material to be visible, the color material overlaps the touch inactive region and does not overlap the touch active region, the color material overlaps one or more signal lines connected to one or more of the conductive sensing cells in the touch active region of the transparent substrate, and the background layer includes a metal filler layer on the color printing layer and a white printing layer between the color printing layer and the metal filler layer.

17. The touch screen panel as claimed in claim 16, wherein the conductive sensing cells are coupled to the transparent substrate.

18. The touch screen panel as claimed in claim 16, wherein the color material of the color printing layer is different from white.

19. A touch screen panel, comprising:
a transparent substrate;
a background layer including a color printing layer along an edge of a surface of the transparent substrate, the background layer including an upper portion;
an overcoating layer on the surface of the transparent substrate including the upper portion of the background layer; and
conductive sensing cells on the overcoating layer and in a display region for displaying an image, wherein:
the transparent substrate is a window substrate disposed at an uppermost portion of substrates included in a display device, and
the background layer, the overcoating layer, and the conductive sensing cells are formed on a lower surface of the transparent substrate, the lower surface being opposite to a touch surface of the transparent substrate, wherein the substrate includes a touch active region overlapping the display region and a touch inactive region overlapping the color printing layer and wherein:

the color printing layer includes a color material different from black printed on the touch inactive region of the transparent substrate, the color material to block transmission of light to prevent visibility of features under the color printing layer and to allow a predetermined color of the color material to be visible;

the color material overlaps the touch inactive region and does not overlap the touch active region, and the color material overlaps one or more signal lines connected to one or more of the conductive sensing cells in the touch active region of the transparent substrate, wherein the background layer further includes a metal filler layer on the color printing layer and a black printing layer on the metal filler layer.

* * * * *